Feb. 9, 1932.    R. S. READ    1,844,598
MANUFACTURE OF METALLIC ALLOYS
Filed Aug. 11, 1930    2 Sheets-Sheet 1

INVENTOR
Richard S. Read
by Christy, Christy & Wharton
his attorneys

Feb. 9, 1932. R. S. READ 1,844,598
MANUFACTURE OF METALLIC ALLOYS
Filed Aug. 11, 1930  2 Sheets-Sheet 2

INVENTOR
Richard S. Read
by Christy, Christy & Wharton
his attorneys

Patented Feb. 9, 1932

1,844,598

UNITED STATES PATENT OFFICE

RICHARD S. READ, OF SYRACUSE, NEW YORK, ASSIGNOR TO CRUCIBLE STEEL COMPANY OF AMERICA, A CORPORATION OF NEW JERSEY

MANUFACTURE OF METALLIC ALLOYS

Application filed August 11, 1930. Serial No. 474,363.

In the use of the electric arc furnace in metallurgical operations where a comparatively low maximum limit upon the carbon content of the product is fixed, it is often a matter of difficulty to so limit the carbon content, due to the picking up of carbon derived from the furnace electrodes.

An example of this is found in the manufacture in the electric arc furnace of the low-carbon varieties of what are known as stainless steels, or heat-resistant steels, which contain substantial percentages of chromium, or of chromium and nickel. In such manufacture there are necessarily produced considerable quantities of scrap, and the utilization in subsequent heats of the scrap so produced has involved a problem of major economic importance to the steel-maker. These steels are often made to a specification of a carbon content of 0.12 per cent. or less, and if large amounts of scrap of this carbon content are used in the furnace charge, it is difficult to hold the carbon down to the required maximum limit. If it is attempted to eliminate the pick-up of carbon by the usual method of adding iron oxides to the bath to oxidize the carbon, the result is that very little of the carbon is oxidized, by reason of the fact that at the high temperature of the bath the oxides will react with the chromium in the charge, thus failing of the intended purpose, and at the same time carrying chromium into the slag, thus causing a direct loss of this valuable element.

Figure 1:
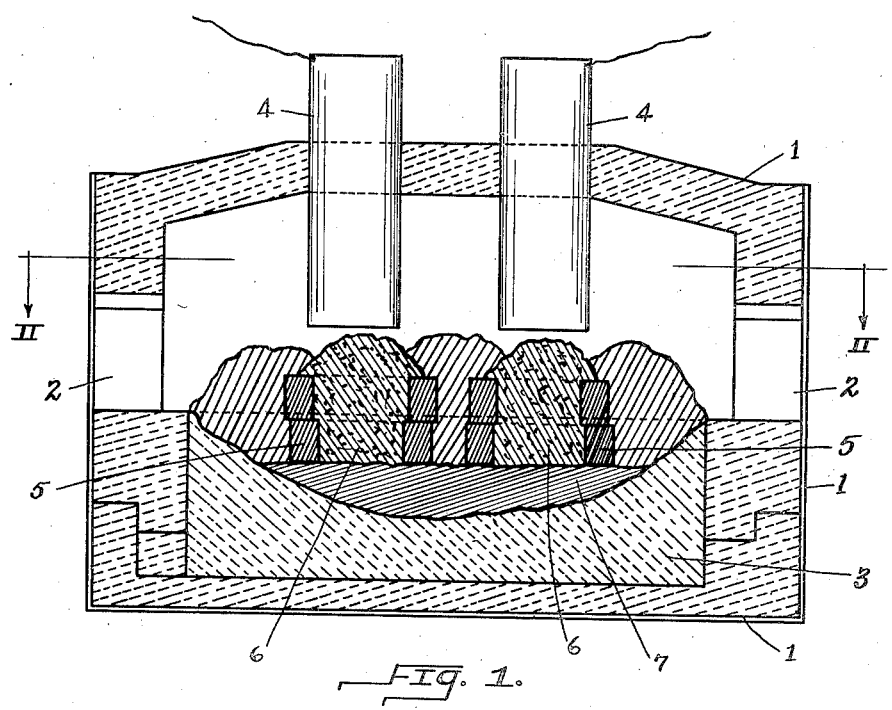
Figure 2:
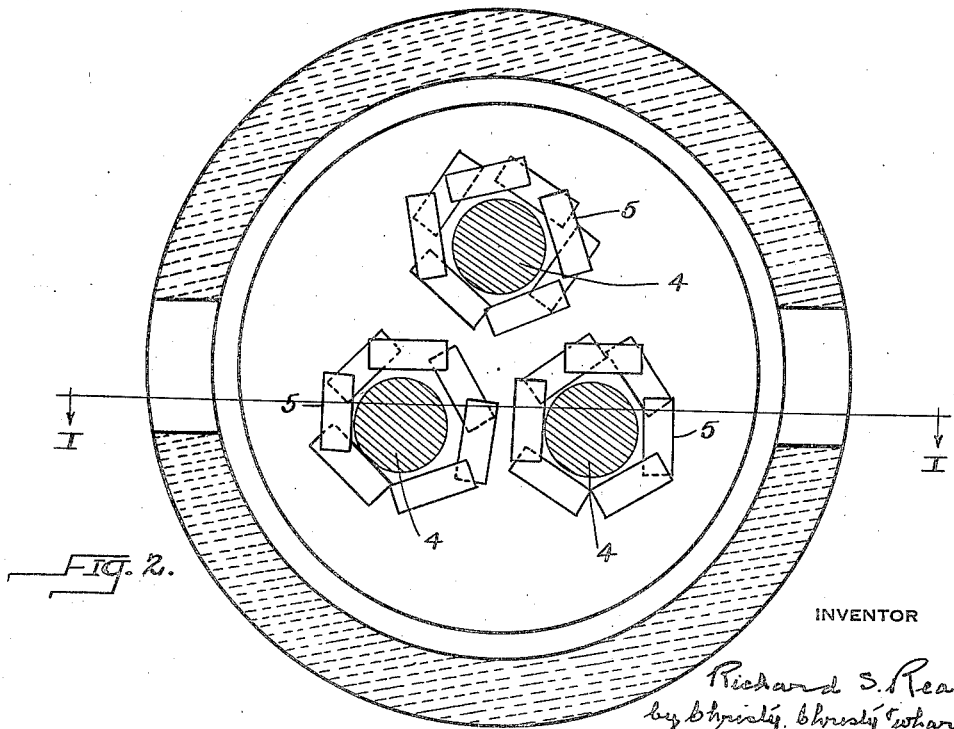
Figure 3:
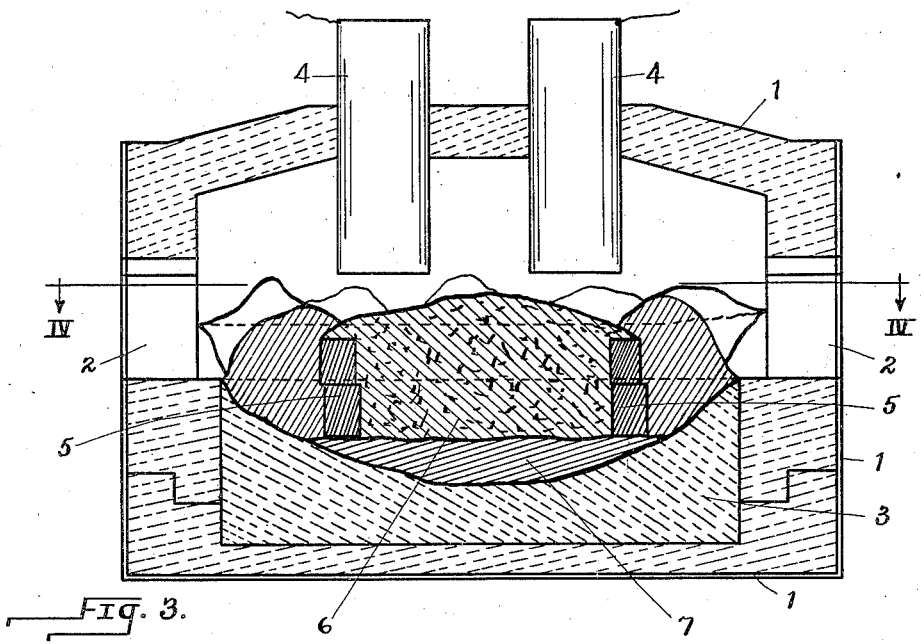
Figure 4:
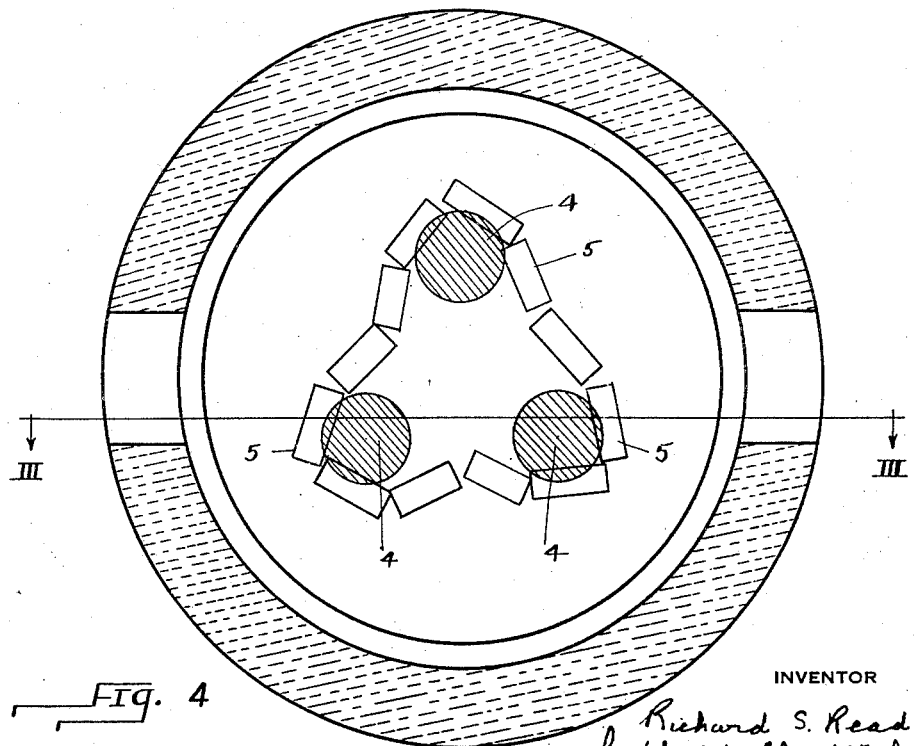

In order to illustrate a practice in accordance with the present invention, I have shown in Figure 1 of the accompanying drawings a sectional elevation of an electric arc melting furnace containing a steel-making charge prepared in accordance with the present invention, this section being taken substantially upon the line I—I of Figure 2. Figure 2 is a horizontal sectional plan view on the line II—II of Figure 1, showing the interior of the furnace prior to charging. Figures 3 and 4 are like views illustrating a modification of the method of charging the furnace.

Referring first to Figures 1 and 2 of the drawings, the walls, floor and roof of the furnace are designated by the numeral 1, opposite doors by the numeral 2, and the furnace hearth by the numeral 3. Immediately under each of the electrodes 4 I construct a pocket or well, which may be done by building up surrounding walls 5 of bundled plain low-carbon sheet scrap, or any low-carbon melting scrap, forming the pockets or wells 6, each immediately under the tip of each electrode. These pockets or wells I fill with a charge of plain low-carbon scrap steel mixed with sufficient amount of metallic oxides to combine with and eliminate all, or substantially all, of the carbon, either in solid or gaseous state, which may be drawn from the furnace electrodes during the time of the initial heating of the charge as hereinafter described. These oxides may be iron ore, or manganiferous iron ore, or oxides of any other metal which may be contained in the finished product, including, of course, mill scale and chromium oxide.

Around and between the islands formed by the charges in these pockets or wells the initial charging of the furnace is completed by charging the accumulated chromium-steel scrap derived from previous heats, with or without plain carbon steel scrap and other steel-producing elements as may be desired. Then at the commencement of the heat the islands of the mixed plain carbon metal and oxides will be melted down first, and as this initial melting proceeds sufficient quantities of lime or other basic substances will be charged on the tops of the islands immediately under the electrodes. In this way the picking up of carbon from the electrodes during the initial heating will be prevented by the oxidation of the carbon by the oxides mingled in the island charges, and the initial melting will proceed outwardly from the regions of these islands into the surrounding charge of the chromium-containing scrap. Thereafter the picking up of carbon in the furnace charge will be prevented by the slag covering the charge, some of which may be removed and additional slag-forming substances added from time to time, as in the usual practice. Tests will be taken for carbon content, and the molten bath will then be ready for the usual additions of ferrochromium, and, if desired, additions of more of the chromium-containing scrap, which additions may be preheated or not, as desired.

The operation will then proceed in the usual manner.

For purposes of illustration I will state the quantities of a furnace charge used in a typical operation of manufacturing that type of non-corrosive chromium-nickel steel known generally as "18—8" (chromium about 18 per cent., nickel about 8 per cent.) with carbon .12 per cent. or under. For a product of about 19,000 pounds of steel of this type, the walls of the pockets or wells were made up of bundles of plain low-carbon sheet steel scrap weighing altogether 1,900 pounds. The wells were charged with 4,000 pounds of plain low-carbon steel scrap, together with 250 pounds of manganiferous iron ore. The charge surrounding and between the wells was made up of 9,500 pounds of "18—8" scrap, amounting to 50 per cent. of the ultimate weight of the product to be obtained, together with 569 pounds of nickel. The total charge thus amounted to 16,219 pounds. After the charge had been melted down, tested for carbon content and brought to the proper conditions for additions, there were added 2,781 pounds of ferrochromium containing 70 per cent. chromium and .10–15 per cent. carbon. The carbon content of the finished product was .09 per cent., chromium 17 per cent. and nickel 8.50 per cent. The total heating period was slightly under four hours.

In Figures 3 and 4 of the accompanying drawings there is shown a modification of the manner of making up the charge, in which three individual wells under each of the three electrodes are replaced by an enlarged single well immediately under the tips of the three electrodes. This charge is made up substantially in the way in which the charges of the individual wells are made up, namely, of plain low-carbon scrap or other steel-producing materials having intermingled therewith the metallic oxides as hereinbefore set forth, sufficient in amount to eliminate any carbon derived from the electrodes during the period of initial heating.

The body 7 shown in the drawings at the bottom of the charge and resting upon the furnace hearth may be plain low-carbon scrap steel, charged for the purpose of providing a level floor for the main body of the charge, or it may be understood as indicating a pool of molten metal derived from the initial melting of the island charges or charge.

It will be observed by the operation above described that there is practically no decarbonization of the bath itself. That is to say, the effort is made to hold the carbon content of the finished product at the percentage of the carbon available in the charge mixture to the total charge mixture. In practice I have succeeded in doing so within a range of not more than .03 to 0.5 per cent. of carbon content above this ideal percentage.

It will be understood, of course, that the operation above described may be varied considerably according to operating conditions, and the relative proportions of the charge mixtures may vary according to the size of the furnace and the product desired, the essence of the invention being believed to reside in the concentration in the initial charge in the immediate neighborhood of the furnace electrodes of metallic oxides in sufficient quantity to prevent the picking up of carbon from the electrodes. This also has the valuable result of reducing directly in the wells or islands the metallic contents of the oxides therein contained, without materially oxidizing the balance of the bath.

While I have illustrated and described my invention as utilized for the manufacture of a high chromium alloy steel of predetermined low-carbon content, it may be used for controlling the carbon content of alloy steels generally. It may also be used in the production of other metallic alloys which may contain no iron, or minor percentages of iron, such for instance as the well known alloys of nickel and chromium, or cobalt and chromium, with or without other alloying metals, and designed to contain only a fixed maximum of carbon, or practically no carbon at all.

I claim as my invention:

1. In the manufacture of metallic alloys in an electric arc furnace, the method which consists in forming in the charge mixture immediately beneath the furnace electrodes an island or islands of components of the alloy having mingled therewith metallic oxides, and melting and refining the charge.

2. In the manufacture of metallic alloys in an electric arc furnace, the method which consists in forming the charge mixture with an oxidizing portion immediately beneath the furnace electrodes, and the balance substantially free from oxides, melting and refining the charge, and oxidizing carbon derived from the electrodes without materially oxidizing the balance of the bath.

3. In the manufacture in an electric arc furnace of a ferrous alloy containing chromium and of predetermined carbon content, the method which consists in initially charging into the furnace ferrous substances including substantial quantities of ferrous scrap containing chromium, forming in such initial charge immediately beneath the furnace electrodes an island or islands of ferrous substances and metallic oxides, melting said initial charge, adding to the molten charge further quantities of ferrous substances containing chromium, and continuing the melting and refining of the charge.

4. In the manufacture in an electric arc furnace of a ferrous alloy containing chromium and of predetermined carbon content, the method which consists in forming under the furnace electrodes a segregated well or wells and filling said wells with ferrous substances and metallic oxides, filling the balance of the furnace hearth with ferrous substances including ferrous alloy scrap containing chromium, melting the initial charge, adding to the molten charge further quantities of ferrous substances containing chromium, and continuing the melting and refining of the charge.

In testimony whereof I have hereunto set my hand.

RICHARD S. READ.